(No Model.)

W. H. NEWELL.
FLUSHING APPARATUS FOR WATER CLOSETS.

No. 359,461. Patented Mar. 15, 1887.

WITNESSES:
L. Douville
Chas. Busoth

INVENTOR:
Wm H Newell
BY
John A Wiedersheim
ATTORNEY.

UNITED STATES PATENT OFFICE.

WILLIAM H. NEWELL, OF PHILADELPHIA, PENNSYLVANIA.

FLUSHING APPARATUS FOR WATER-CLOSETS.

SPECIFICATION forming part of Letters Patent No. 359,461, dated March 15, 1887.

Application filed May 26, 1886. Serial No. 203,287. (No model.)

*To all whom it may concern:*

Be it known that I, WILLIAM H. NEWELL, a citizen of the United States, residing in the city and county of Philadelphia, State of Pennsylvania, have invented a new and useful Improvement in Flushing Apparatus for Water-Closets, which improvement is fully set forth in the following specification and accompanying drawings, in which—

Figure 1:
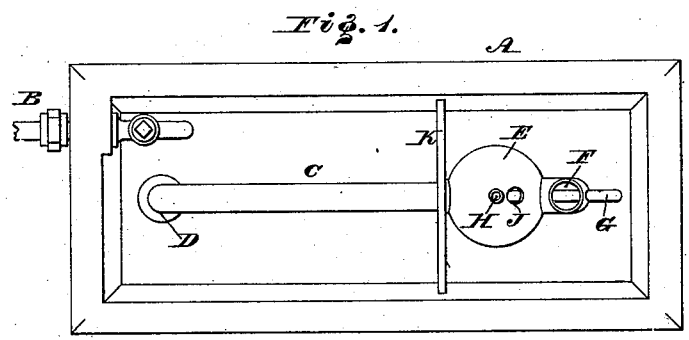
Figure 2:
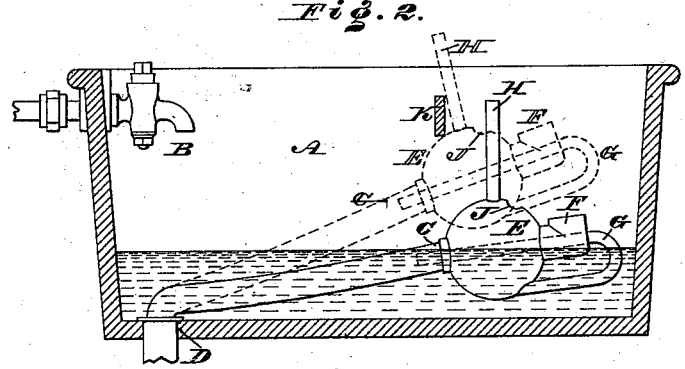
Figure 3:
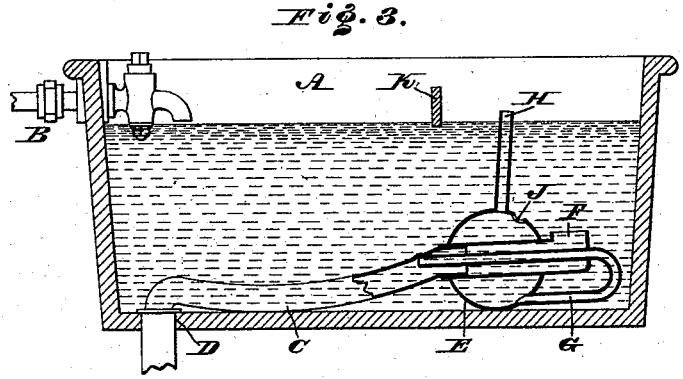

Figure 1 represents a top or plan view of a flushing apparatus for water-closets embodying my invention. Fig. 2 represents a view of the interior thereof, the tank being in section. Fig. 3 represents a longitudinal section thereof.

Similar letters of reference indicate corresponding parts in the several figures.

My invention consists of apparatus which flushes water-closets periodically.

Referring to the drawings, A represents a tank which is provided with a cock, B, whereby the tank may be continuously supplied with water.

C represents a tube, which is connected with the tank and in communication with the outlet D thereof, and formed of flexible material, or otherwise constructed that it may rise and fall with a float, E, to which it is attached, said tube passing through the float and having its end F open into the tank.

G represents a bent tube, which has one end connected with the float and the other end located within the tube C, so that said tube is in communication with the float and said tube C.

Rising from the float is an air-pipe, H, and formed in the float is an opening, J, for the inlet of water. Secured to the upper portion of the tank is a stop, K, against which the float is adapted to strike, so as to limit the ascent of the same. Water flows into the tank from the cock B, and the float rises therewith. When the float reaches the stop K, its ascent ceases, but the water continues to rise, and reaching the inlet J, enters the same, thus filling the float, the air escaping through the pipe H. The float now sinks, and the water enters the pipe C at the open end F, and so leaves the tank, and reaches the water-closet, flushing the same. The water flowing through the pipe C creates a vacuum in the tube G, whereby the water in the float is discharged through said tube G into the pipe C, and so passes to the water-closet. The float being empty is permitted to rise with the inflowing water of the tank, and when it reaches the stop K the operations hereinbefore stated are repeated, and thus the water-closet is automatically flushed, and at periods the intervals of which may be adjusted or regulated by the flow of the water into the tank at the cock B.

It is evident that the apparatus is applicable to the flushing of sewers and other receptacles.

Having thus described my invention, what I claim as new, and desire to secure by Letters Patent, is—

1. An automatic periodical flushing apparatus having a hollow float, a flexible pipe having one end secured to the outlet of a tank and the other passing through said float and provided with an opening, and a tube having one end connected with the lower portion of the float and the other end opening into said flexible pipe, all substantially as and for the purpose set forth.

2. In an automatic periodical flushing apparatus, the hollow float E, with opening J, and air-pipe H, the flexible pipe D, having opening F at the upper end thereof, and being connected to the said float, the tube G, leading from the float E to the inside of said flexible pipe D, all substantially as and for the purpose set forth.

3. An automatic periodical flushing apparatus composed of a tank with inlet-pipe and an outlet with a flexible discharge-pipe connected to a hollow float and having an open end, the said float having an opening in its upper part and an air-pipe extending above the water-level in said tank, a tube opening into the discharge-pipe from the lower part of said float, and a stop secured to said tank and adapted to limit the rise of said float, all substantially as described.

4. In an automatic periodical flushing apparatus, the tank A, having inlet-pipe B, the tube C, connected at its lower end to the outlet D in the bottom of the tank and having its other end passing through the float E and opening into the tank, the said float having the air-pipe H, the bent tube G, leading from the float E and emptying into the tube C, and the stop K, all of said parts being so arranged and combined as to operate automatically and continuously, substantially as described.

WM. H. NEWELL.

Witnesses:
GEO. S. HORNER,
JOHN W. HUDSON.